United States Patent [19]

Bothun

[11] 4,251,241
[45] Feb. 17, 1981

[54] CYCLONE-TYPE ASPIRATED SEPARATOR FOR WASHING DIRT-LADEN DRY AIRSTREAMS

[75] Inventor: Eugene L. Bothun, Berthoud, Colo.

[73] Assignee: Windsor Industries, Inc., Denver, Colo.

[21] Appl. No.: 54,845

[22] Filed: Jul. 5, 1979

[51] Int. Cl.³ ............................................. B01D 47/16
[52] U.S. Cl. .............................. 55/238; 55/257 NP; 55/429; 55/DIG. 3; 261/78 A; 261/79 A; 15/353
[58] Field of Search .................................. 55/235–238, 55/249, 257 MP, 260, DIG. 3, 244, 429; 261/78 A, 79 A, DIG. 54; 15/353

[56] References Cited

U.S. PATENT DOCUMENTS

| | | | |
|---|---|---|---|
| 941,676 | 11/1909 | Green | 55/249 |
| 978,739 | 12/1910 | Griswold et al. | 55/244 |
| 1,363,860 | 12/1920 | Fetters et al. | 55/DIG. 3 |
| 2,069,889 | 2/1937 | Lowther | 55/249 |
| 2,184,731 | 12/1939 | Brewer | 55/238 |
| 2,832,432 | 4/1958 | Fanton | 55/249 |
| 3,464,189 | 9/1969 | Mergenthaler | 55/257 MP |
| 4,078,908 | 3/1978 | Blackman | 55/237 |
| 4,117,714 | 10/1978 | Goodson et al. | 55/238 |

FOREIGN PATENT DOCUMENTS 566615  8/1977  U.S.S.R. .................................... 55/238

*Primary Examiner*—David L. Lacey
*Attorney, Agent, or Firm*—Edwin L. Spangler, Jr.

[57] ABSTRACT

This invention relates to a cyclone-type aspirated dirt separator for use in washing dirt from dirt-laden dry airstreams and, more particularly, to a device of the class described which is especially suited for use with a dry pick-up vacuum cleaner as a means for collecting the dirt it picks up in a water bath. The separator is characterized by a riser tube with an open top and an opening in its lower end immersed in a water bath into which dirt-laden dry air is introduced tangentially for ascending spiral movement therethrough while simultaneously aspirating water. Internal baffles create turbulent flow in the water/dirt-laden air mixture and they thus prevent vortexing which otherwise results in a relatively unwashed dirt-laden air column centered inside a hollow water column. A venturi adjacent the outlet of the riser tube accelerates the turbulent mixture against a dome in the underside of the cannister lid where the clean air separates and the dirt-laden water cascades down the outside of the riser tube back into the bucket containing the water bath. The invention also contemplates a removable cannister lid and aspirator subassembly that provides ready access to the bucket containing the dirty water that sits inside the cannister well.

9 Claims, 5 Drawing Figures

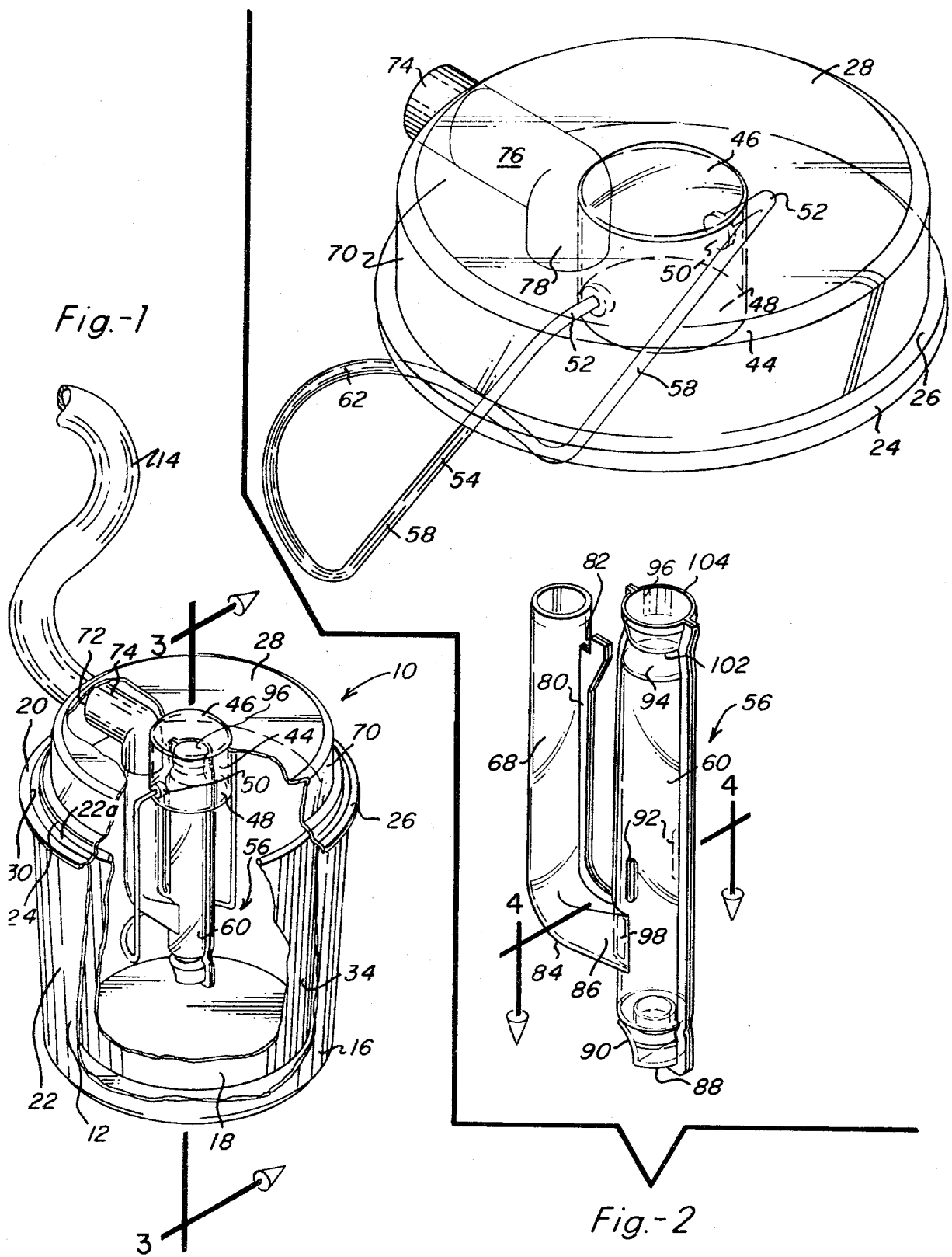

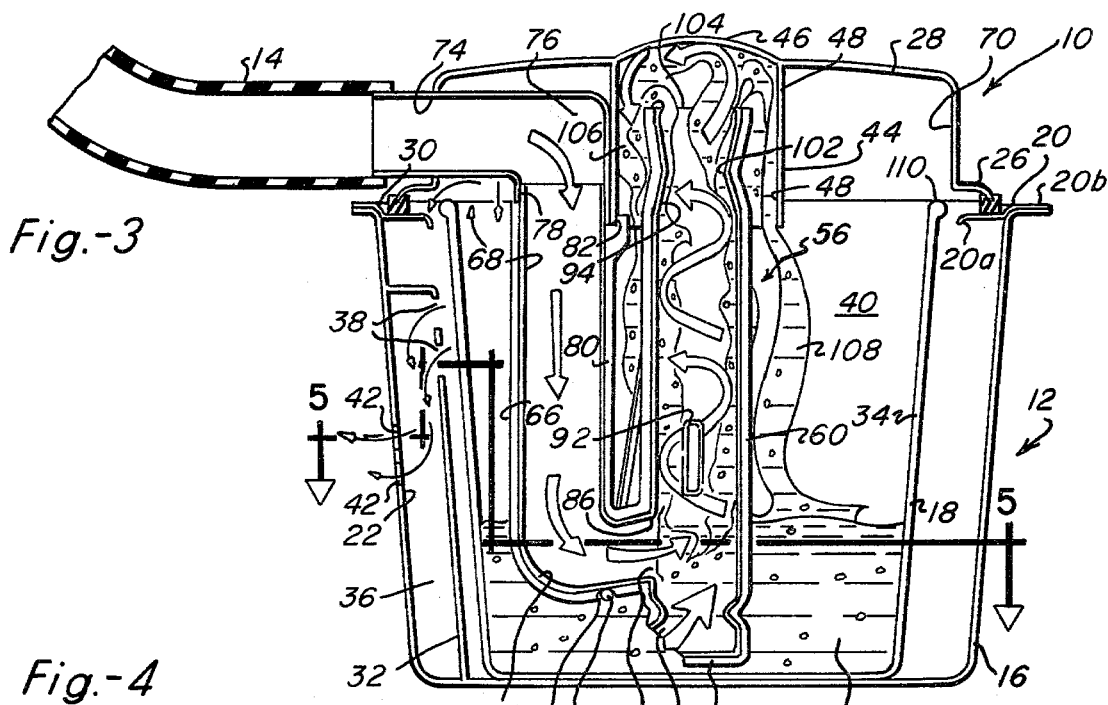
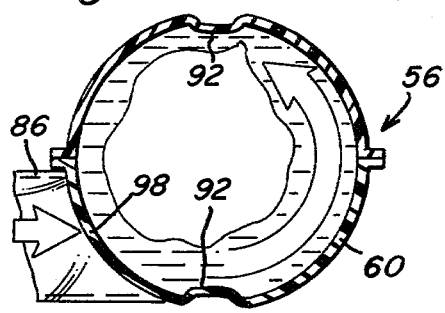
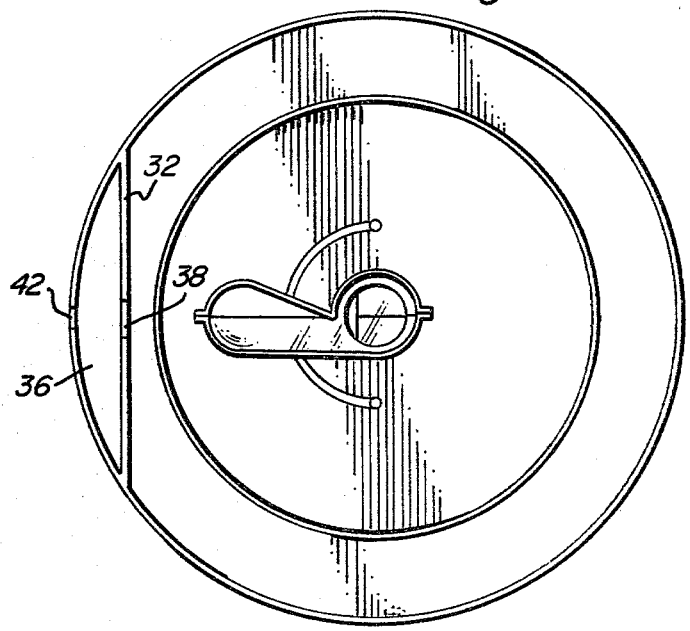

CYCLONE-TYPE ASPIRATED SEPARATOR FOR WASHING DIRT-LADEN DRY AIRSTREAMS

One convenient way of characterizing vacuum cleaners lies in the medium used to pick-up dirt from floor coverings and the like, i.e. one being the so-called "wet pick-up type" while the other is the "dry pick-up type." In the former, water or some other liquid medium is first applied to the floor covering and then drawn up along with air and entrained dirt before being deposited in a suitable receptacle. The dry pick-up type eliminates the fluid medium altogether and draws up only dirt and air which is transferred to some sort of porous bag which passes the air freely therethrough but filters out the dirt.

There are many advantages to the wet pick-up vacuum in terms of more nearly dustless operation, more effective removal of the dirt both from the floor covering and the liquid medium, etc. On the other hand, such units are, more often than not, commercial units used by professional carpet cleaners as opposed to simple household appliances of the kind ordinarily found in the home. Nevertheless, there are enough worthwhile advantages to the wet pick-up unit to warrant trying to capture them in a dry pick-up type.

The prior art attempts at combining certain of the best features of both of these types of vacuum cleaners have most often resulted in a unit where no liquid is applied to the floor covering, but instead, the mixture of air and dirt is passed through a liquid bath of some sort which extracts the dirt therefrom in an essentially dust-free manner. For example, several prior art units merely bubble the dirt-laden air through a water bath which effectively traps the dirt. Little's early U.S. Pat. No. 980,977 along with the two Fetters et al U.S. Pat. Nos. 1,363,859 and 1,363,860 all show such a system as do the patents to Markstein (U.S. Pat. No. 942,037) and Ingram (U.S. Pat. No. 2,721,065). Griswold et al's U.S. Pat. No. 978,739 reveals an analogous system. Unfortunately, as might be expected, these force-fed units require large motors which not only make the units quite expensive but heavy and bulky as well.

Probably the most promising compromise is that exemplified by another of Little's early patents U.S. Pat. No. 996,991 wherein, instead of forcing the dirt-laden air through a water bath, it is used to aspirate water from a reservoir into the dry mixture. Once the water droplets entrained in the air have mixed with the dirt entrained therein, a physical separation of the clean air from the dirty water takes place whereupon the air is returned to the atmosphere and the water to the reservoir for eventual disposal. Parise & Sons, Inc. took out U.S. Pat. Nos. 3,896,521 and 3,911,524, both of which relate to aspirator-type units; however, it is their latest commercial product which, so far as applicant knows is as yet unpatented, that most closely resembles the dry pick-up unit forming the subject matter of the instant invention. In this Parise & Sons unit, dirt-laden air is taken into a cannister having water in the bottom and forced down through an inner open-bottomed tube into an upturned cup located beneath the latter. As the dirt-laden air emerges from the cup, it rises in a riser tube enveloping both the cup and open-bottomed inner tube at which point holes in the annular space between the two tubes aspirate water into the ascending airstream within the annulus. The water/dirt-laden air mixture then impinges against a dome and the dirty water exits the outer tube through a pair of oppositely-facing downturned discharge ports. The dirty water returns to the reservoir where the water was aspirated from originally and the clean air exits the cannister through a downspout therein.

It has recently been determined that excellent separation of the dirt from the air can be achieved by the simple, yet unobvious expedient of introducing the dirt-laden airstream tangentially near the bottom of an open-topped riser tube immersed in a bucket partially filled with water. As the tangentially-directed dirt-laden airstream spirals up the riser tube, it aspirates in water through openings in the latter beneath the air inlet and then directs the mixture across baffles located inside the riser tube thus inducing turbulent flow. As the water/dirt/air mixture reaches the top of the riser tube it impinges against a dome covering the open top whereupon the dirty water returns to the bucket and the clean air exits the system through an annulus left between the outside of the bucket and the cannister housing the latter.

It is, therefore, the principal object of the present invention to provide a novel and improved aspirator-type dirt entrainment separator for use with dry pick-up vacuum cleaners and the like.

A second objective is the provision of a device of the class described wherein the dirt-laden air is introduced tangentially into the aspirator.

Another object is to provide a water bath dirt collector for vacuum sweepers wherein the dirty water is deposited in a bucket which can be readily separated from the aspirator and the lidded cannister housing same to be emptied.

Still another objective is to provide a cyclone-like aspirator internally baffled to induce turbulent flow and minimize vortexing of the dirt-laden air inside an ascending hollow spiralling water column.

An additional object is the provision of a device of the type aforementioned that incorporates a venturi adjacent the outlet of the riser tube which effectively accelerates the dirt-laden air/water mixture and facilitates separation of the clean air from the dirty water which impinges against the cannister dome preparatory to cascading down into the bucket.

Further objects are to provide a water bath type aspirating system for separating dirt from dirt-laden air which is simple, compact, easy to use, convenient to empty, lightweight, versatile, a unit that is fully compatible for use with most dry pick-up vacuum units or else easily adapted for such use, and a device of the class described which is decorative in appearance.

Other objects will be in part apparent and in part pointed out specifically hereinafter in connection with the description of the drawings that follows, and in which:

FIG. 1 is a perspective view showing the cannister housing the water bath bucket and aspirator connected to a vacuum hose delivering dirt-laden dry air thereto;

FIG. 2 is an exploded perspective view to a greatly enlarged scale showing the subassembly that includes the cyclone-type aspirator lid releasably connectable to the latter by means of a swinging wire bail;

FIG. 3 is a diametrical section to approximately the same scale as FIG. 2 showing the complete unit in assembled relation;

FIG. 4 is a fragmentary section through the aspirator to a greatly enlarged scale and taken along line 4—4 of FIG. 2; and, FIG. 5 is a horizontal section taken along line 5—5 of FIG. 3 and to the same scale as the latter.

Referring next to the drawings for a detailed description of the present invention and, initially, to FIGS. 1 and 2 for this purpose, reference numeral 10 has been chosen to designate the dirt removal unit in its entirety and its working parts can be seen housed inside a cannister 12 connected to a conduit 14 through which the dirt-laden dry air is delivered thereto in the form of a force-fed stream. Cannister 12 consists of an open-topped vessel 16 housing inside thereof a removable bucket 18. The upper marginal edge of vessel 16 is bordered by a broad horizontally-disposed rim 20 that projects both inwardly and outwardly beyond its slightly flared wall 22. The inwardly-projecting flange 20a of rim 20 defines a ledge or seat atop which annular gasket 24 sits that borders the marginal flange 26 encircling the cannister lid 28. The inwardly-projecting flange 20a of rim 20 is recessed slightly beneath the outwardly-projecting flange 20b thereof so as to define an annular step 30 therebetween that functions to maintain the lid centered atop the vessel.

In FIGS. 3 and 5 it can be seen that cannister vessel 16 includes a partition wall 32 located between its outer wall 22 and the bucket wall 34. This partition wall functions to divide off a compartment 36 inside vessel 16 accessed from the main body thereof by air intake ports 38, the function of which is to receive the clean air stripped of its dirt that is discharged inside the main compartment 40 thereof and return same to the atmosphere through exhaust ports 42 in vessel wall 22 inside compartment 36, all of which will be described in somewhat greater detail presently.

The lid 28 can best be seen in FIGS. 1, 2 and 3 to which reference will be made next. In the center of the lid is an integrally-formed inverted cup-shaped dome 44, the top 46 of which is slightly concave as seen from the underside thereof. The skirt 48 of this dome is more or less cylindrical in the particular form shown and it extends down into vessel 16 to a level somewhat beneath rim 20. A pair of diametrically-positioned sockets 50 are located on the outside of the skirt and they cooperate to hingedly support the inturned ends 52 of wire bail 54 that detachably connects the cyclone subassembly that has been broadly designated by reference numeral 56 in hanging position underneath the lid. This bail has a pair of arms 58 that hang down along opposite sides of the riser tube 60 forming a part of this subassembly and these arms are connected at their lower extremities by a horizontally-disposed semicircular crosspiece 62. With arms 54 located in essentially vertical position alongside the riser tube, crosspiece 62 encircles the bottom end thereof and locks with a spring action into notch 64 (FIG. 3) in the web 66 on the outside of air intake tube 68 that also forms an integral part of the cyclone subassembly. Springing crosspiece 62 of the bail 54 down frees it from notch 64 and allows it to be swung out of the way into the unlocked or disengaged position shown in FIG. 2 thus enabling the cyclone subassembly to be disconnected from the cannister lid.

A downturned annular skirt 70 separates marginal flange 26 of the lid from its top containing dome 44. A hole 72 in this skirt mounts the horizontal leg 74 of elbow 76 which connects into the discharge end of conduit 14 and receives the dirt-laden dry air therefrom. The vertically-disposed leg 78 of this elbow telescopes over the outside of intake tube 68 of the cyclone subassembly in the manner revealed most clearly in FIG. 3. This elbow 76 is secured within hole 72 in the cannister lid and remains an integral part thereof.

Up to this point with but a few exceptions, the better part of what has been described is fairly straight forward and consists mainly of the elements necessary to deliver dry dirt-laden air into a bucket resting in the bottom of a lid-covered cannister. From here on, however, the unit will be seen to differ significantly from those prior art units previously described and for this purpose reference will be made to FIGS. 2, 3 and 4.

Intake tube 68 of the cyclone subassembly also has an integrally-formed web 80 on the inside thereof adjacent the riser tube 60 in the particular form illustrated. This web has the upper end thereof notched as shown at 82 to receive the lower edge of the skirt 58 bordering dome 46 in the lid. When these parts are interengaged as shown in FIG. 3, they coact to maintain riser tube 60 essentially centered with respect to dome 46 which it projects up into.

The lower end of intake tube 68 includes a bend 84 terminating in a constricted throat 86 located at the point where it enters the riser tube tangentially as best seen in FIG. 4. Bend 84 is in excess of 90°, probably around 105°, so that the dirt-laden air entering the riser tube 60 will be directed upward slightly as well as tangentially. Throat 86 is shaped to direct the airflow tangentially along the inside wall of the riser tube at a point spaced slightly above its lower end 88. This tangential flow pattern together with the upward tilt of the throat due to the over 90° bend in the passage leading thereto causes the dirt-laden air along with the water aspirated therein through opening 90 in the base of the riser tube to spiral upwardly as shown by the arrows in FIG. 3 across baffles 92 and through venturi 94 before existing out the open upper end 96 into dome 46. Water intake opening 90 in the bottom of the riser tube opens both below and slightly behind the air intake opening 98 at the exit end of throat 86 so as to not short circuit the dirt-laden air right back out into water bath 100 in the bottom of bucket 18 within which the lower end 88 of the riser tube is immersed as shown. Thus, the forced-fed stream of dirt-laden air entering the riser tube near the bottom thereof aspirates water into it and carries the resulting water/dirt-laden air mixture up and across baffles 92 which intercept same and induce violent turbulent flow. The turbulence thus induced, both mixes the water into the airstream where it can best collect the dirt therefrom and, in addition, prevents the water from vortexing and forming a hollow column with the airstream rising in the middle of it along with the dirt.

Turning the attention to FIG. 3 in particular, as the water is aspirated into the riser tube and circulated "cyclone fashion", it mixes with the dirt-laden air and strips the dirt therefrom. Then, when it approaches the upper end of the riser tube it enters the narrow neck 102 of venturi 94 and is accelerated upward against the concave underside 46 of dome 44. The upper extremity 104 of the riser tube is spaced beneath the top of the dome and, in addition, is of smaller outside diameter than the inside of skirt 48 so as to leave an annular gap 106 therebetween. The dirty water 108 exiting the top of the riser tube cascades down through this annular gap 106 and returns to water bath 100 to be recirculated. The clean air, on the other hand, passes out underneath the skirt 48 of the dome 46 and over the lip 110 of the bucket where it eventually finds its way to compartment 36 through openings 38 and exits the cannister by means of exhaust openings 42 in the wall 22 thereof.

When the water in water bath 100 becomes dirty, the user merely lifts off the lid and the cyclone subassembly comes with it due to bail 54 holding them in assembled relation. With these elements out of the way, ready access is had to bucket 18 which can be lifted out of the open cannister and emptied. From time to time, the cyclone subassembly needs to be cleaned and one need only swing bail 54 open to detach it from the cannister lid.

What is claimed is:

1. A dirt separation and collection apparatus for use in washing dirt from an essentially dry dirt-laden airstream under pressure which comprises: a first open-topped vessel and a lid therefor cooperating in assembled relation to define a cannister with air inlet and air outlet openings; a first open-topped tubular member disposed in upright position inside the cannister with the open upper end thereof spaced beneath the lid said first tubular member having a first opening in its lower end for admitting water thereto upon immersion in a supply of the latter contained within said first vessel, and a second opening above the first; and a second tubular member terminating in an upturned nozzle connected to said inlet opening so as to receive dirt-laden air under pressure from the air inlet opening and said nozzle being constructed and connected to said second opening so as to deliver the air upwardly and tangentially into the first tubular member through the second opening therein, said first and second tubular members coacting to aspirate water into the incoming dirt-laden airstream and spiral the resulting dirt-laden air/water mixture upwardly and out against the cannister lid through the open upper end of said first tubular member, and said lid coacting with said first tubular member to return the dirty water issuing therefrom to said first vessel while exhausting the clean air through the air-outlet opening in the latter.

2. The apparatus for washing dirt from a dirt-laden airstream as set forth in claim 1 which further includes baffles inside the first tubular member positioned between the second opening therein and its upper open end, said baffles being shaped and located so as to produce turbulent flow in the spiralling stream effective to mix the water and dirt-laden air ascending therein.

3. The apparatus for washing dirt from a dirt-laden airstream as set forth in claim 1 wherein the first and second tubular members are interconnected in side-by-side substantially parallel relation.

4. The apparatus for washing dirt from a dirt-laden airstream as set forth in claim 3 wherein the nozzle of the second tubular member comprises a constricted throat portion which is connected to the second opening.

5. The apparatus for washing dirt from a dirt-laden airstream as set forth in claim 1 wherein a partition wall is located inside the first vessel dividing the interior thereof into two separate compartments, and in which one of said compartments contains the air outlet opening while the other houses the supply of water.

6. The apparatus for washing dirt from a dirt-laden airstream as set forth in claim 1 in which means hanging from the inside of the lid cooperates therewith to define an inverted generally cup-shaped dome positioned and adapted to receive the mixture issuing from the upper open end of the first tubular member and return the dirty water contained therein to the first vessel thereberneath so as to bypass the latter around the outlet opening.

7. The apparatus for washing dirt from a dirt-laden airstream as set forth in claim 1 wherein a second open topped vessel is housed inside the first, said second vessel containing the supply of water and being removable from the first upon removal of the cannister lid.

8. The apparatus for washing dirt from a dirt-laden airstream as set forth in claim 1 wherein said first and second openings in the first tubular member are located relative to one another such that the dirt-laden airstream entering the second bypasses the first.

9. The apparatus for washing dirt from a dirt-laden airstream as set forth in claim 1 wherein a generally U-shaped bail depends from the inside of the lid and is attached thereto for swinging movement between an open position disengaged from the first and second tubular members and a closed position supporting the latter from said lid.

* * * * *